(12) United States Patent
Araujo, Jr. et al.

(10) Patent No.: US 9,213,542 B2
(45) Date of Patent: Dec. 15, 2015

(54) CREATING TEMPLATES OF OFFLINE RESOURCES

(75) Inventors: Nelson Sampaio Araujo, Jr., Redmond, WA (US); Steven Paul Robertson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1170 days.

(21) Appl. No.: 11/393,585

(22) Filed: Mar. 30, 2006

(65) Prior Publication Data
US 2007/0234334 A1 Oct. 4, 2007

(51) Int. Cl.
G06F 9/44 (2006.01)
G06F 9/445 (2006.01)
G06F 9/455 (2006.01)

(52) U.S. Cl.
CPC .. *G06F 8/76* (2013.01); *G06F 8/61* (2013.01); *G06F 8/70* (2013.01); *G06F 8/71* (2013.01); *G06F 8/74* (2013.01); *G06F 9/45558* (2013.01); *G06F 8/60* (2013.01); *G06F 2009/45562* (2013.01)

(58) Field of Classification Search
None
See application file for complete search history.

(56) References Cited

U.S. PATENT DOCUMENTS

| 7,000,231 | B1 | 2/2006 | Gold | |
|---|---|---|---|---|
| 7,523,089 | B2 * | 4/2009 | Guruprakash | 1/1 |
| 7,840,961 | B1 * | 11/2010 | Weathersby | 717/177 |
| 8,209,680 | B1 * | 6/2012 | Le et al. | 717/174 |
| 2002/0156877 | A1 * | 10/2002 | Lu et al. | 709/221 |
| 2003/0158926 | A1 | 8/2003 | Kroening | |
| 2003/0233644 | A1 * | 12/2003 | Cohen et al. | 717/171 |
| 2004/0015959 | A1 | 1/2004 | Kobayashi | |

FOREIGN PATENT DOCUMENTS

AU 2007235540 A1 10/2007
JP 2003-288216 10/2003

(Continued)

OTHER PUBLICATIONS

Microsoft Corporation, "Introduction to Windows 2000 Server", white paper, http://www.microsoft.com/windows2000/docs/gpintro.doc, 1999.

(Continued)

*Primary Examiner* — Jason Mitchell
*Assistant Examiner* — Mark Gooray
(74) *Attorney, Agent, or Firm* — Henry Gabryjelski; Kate Drakos; Micky Minhas

(57) ABSTRACT

Implementations of the present invention allow software resources to be duplicated efficiently and effectively while offline. In one implementation, a preparation program receives an identification of a software resource, such as a virtual machine installed on a different volume, an offline operating system, or an application program. The preparation program also receives an indication of customized indicia that are to be removed from the software resource. These indicia can include personalized information as well as the level of software updates, security settings, user settings or the like. Upon execution, the preparation program redirects the function calls of the preparation program to the software resource at the different volume (or even the same volume) while the software resource is not running. The preparation program thus can thus creates a template of the software resource in a safe manner without necessarily affecting the volume at which the preparation program runs.

16 Claims, 4 Drawing Sheets

(56) References Cited

FOREIGN PATENT DOCUMENTS

JP          2006-011781       1/2006
WO     WO 2007/117363 A1    10/2007

OTHER PUBLICATIONS

Microsoft Corporation, "IntelliMirror Technologies", Microsoft TechNet, Mar. 28, 2003.
Supplementary European Search Report dated Jul. 21, 2009 issued in Application No. EP07751402, 8 pages.
Bowen Alpern et al., "PDS: a virtual execution environment for software deployment", International Conference on Virtual Execution Environments, 2005, pp. 175-185.
"Notice of Allowance Received for Mexico Patent Application No. MX/a/2008/011907", Mailed Date: Oct. 15, 2013, Filed Date: Feb. 21, 2007, 2 Pages. (w/o English Translation).
"Notice of Allowance Received for Korea Republic of (KR) Patent Application No. 10-2008-7023181", Mailed Date: Nov. 20, 2013, Filed Date: Feb. 21, 2007, 2 Pages. (w/o English Translation).
"Office Action Received for Canada Patent Application No. 2644167", Mailed Date: Feb. 25, 2014, Filed Date: Feb. 21, 2007, 2 Pages.

* cited by examiner

CREATING TEMPLATES OF OFFLINE RESOURCES

CROSS-REFERENCE TO RELATED APPLICATIONS

N/A

BACKGROUND

1. Background and Relevant Art

There are a number of ways to distribute different types of resources (software, hardware, or combinations thereof) in a computerized environment. From a software standpoint, for example, an enterprise might install multiple copies of the operating system (or application program) on multiple different computers, and thereby distribute one copy among many systems. Along these lines, the enterprise may also need to install several additional software updates to the copied or shared operating system, and thus also share multiple copies of these updates among the many systems. Conventional ways of sharing hardware include setting up computer systems on a network so that multiple different computer systems can access another computer's drive space for various storage or file sharing needs.

Additional ways of distributing resources from a combined software and hardware standpoint include creating unique entities on a single physical computer system, where the entities behave as separate and independent computer systems, but share the same physical media and processing resources. For example, an enterprise might create multiple virtual machines on at the same single server, each of which can be separately addressed by another computer as if each given virtual machine were its own separate computer system. In one such implementation, one or few servers in a large enterprise can also host several virtual machines on the same set of hardware, where those virtual machines can each serve as additional servers, or network accessible personal computers, however configured.

One will understand that such entities as virtual machines combine the sharing of software and hardware resources since they are typically set up with an existing copy of an operating system used by another virtual machine, and since they may even share a drive that is already being used by the other virtual machine. Despite sharing the same operating system, however, the enterprise will need to customize aspects of the operating system so that the virtual machine is not confused with other virtual machines using the same copy of the operating system, particularly when installed on the same physical drive. To create a customized virtual machine, therefore, a system administrator will need to provide the new virtual machine with unique indicia that distinguishes it from other virtual machines (or other computer systems), such as machine name, time zone, domain name, company name, product keys, and the like.

Simply customizing the virtual machine, however, can be fairly difficult. For example, the system administrator may desire to simply install the virtual machine from a basic installation copy of an operating system, and then apply all the various software patches of interest, as well as unique virtual machine indicia. Of course, this can be fairly inconvenient if there are a large number of software patches and other unique customizations that the system administrator would like to apply. Thus, the system administrator may prefer to copy one instance of an operating system that has already been customized to the system administrator's preferences from a software standpoint, and then install that copy in the new virtual machine albeit with different unique indicia. As such, the system administrator will need to remove the custom indicia from the existing copy-of-interest before installing that copy in the new virtual machine.

Nevertheless, there are different difficulties with simply removing customized indicia from one operating system copy and then adding new customized indicia to the operating system copy on a new virtual machine. In particular, conventional preparation software that might be used to create a "generic" or "template" copy of an operating system (or application) can be difficult to use, and can take a significant amount of time. For example, a system administrator might need to start up a copy of the operating system of interest, and then run certain preparation software on top of the operating system while it is running. As the preparation software removes certain unique features of the operating system copy, the preparation software may require the operating system to reboot several times until all unique features have been removed.

Besides the difficulties inherent in continually restarting the operating system (or application) due to simple delay, conventional preparation software can also be technically complex and difficult to use. In particular, if a user fails to appropriately configure the preparation software before attempting to convert an operating system into a generic or template copy, the user may strip out items the user did not intend to strip. This could result in the user spending more time getting the operating system back to an appropriate point, or even rendering the given operating system-of-interest (or template thereof) inoperable.

Accordingly, there are a number of problems with creating new instances of entities using preexisting software that can be addressed.

BRIEF SUMMARY

Implementations of the present invention solve one or more problems in the art with systems, methods, and computer program products configured to create template copies of offline resources. In particular, implementations of the present invention allow a copy of a particular resource, such as a copy of an operating system or application, to be turned into a generic or template copy of the resource in accordance with a user's specifications, and while the resource is not running (i.e., offline). Implementations of the present invention, therefore, allow a user to create as many template copies of the same resource as desired with a great deal of efficiency and configurability. Such implementations can also provide a convenient user experience toward customizing the template during the process at a later point.

For example, a method of creating a template of at least one of the one or more software resources while the at least one software resource is offline can involve identifying an offline software resource, as well as identifying one or more template settings. These template settings will generally indicate one or more indicia to be removed from the software resource. In addition, the method can involve executing at a first operating system a preparation program configured to remove indicia in accordance with the template settings. The method can also involve redirecting one or more function calls of the preparation program to the identified software resource. As such, the indicia identified by the one or more template settings are removed from the software resource, and a template of the software resource is created.

In addition, a method of duplicating a virtual machine while it is offline, such that the virtual machine and the duplicate virtual machine have distinguishable identities when running can involve receiving the identity of a virtual machine file installed on a first storage space. The method can also involve receiving one or more function calls from a preparation program installed on a second storage space, where the one or more function calls request removal of one or more indicia. In addition, the method can involve executing the one or more function calls on the virtual machine file, which can result in the removal of the requested indicia at the first storage space. Furthermore, the method can involve creating a template copy of the virtual machine file.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
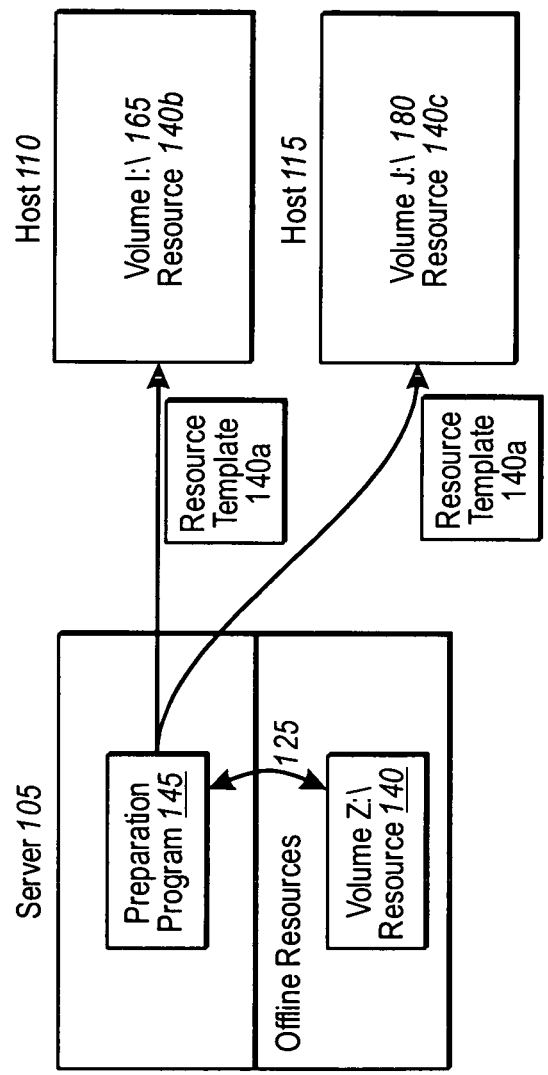
FIG. 1A illustrates an overview schematic diagram in accordance with an implementation of the present invention in which a preparation program creates one or more template copies of an offline resource, and installs the resource at one or more host volumes.

The present invention extends to systems, methods, and computer program products configured to create template copies of offline resources. In particular, implementations of the present invention allow a copy of a particular resource, such as a copy of an operating system or application, to be turned into a generic or template copy of the resource in accordance with a user's specifications, and while the resource is not running (i.e., offline). Implementations of the present invention, therefore, allow a user to create as many template copies of the same resource as desired with a great deal of efficiency and configurability. Such implementations can also provide a convenient user experience toward customizing the template during the process at a later point.

As will be understood more fully from the description and claims herein, at least one advantage of these implementations is that users (e.g., system administrators) can efficiently provide a customized virtual machine to a large number of other users without having to recreate that customized virtual machine from a base level. Furthermore, the user or owner of a customized virtual machine can easily create a template of the user's virtual machine without necessarily having to go through several reboots and/or restarts of the hardware or software associated therewith. In addition, since the process can be automated, some of the typically tough decisions to which regular users would not know the answer (such as Product Keys, DNS, WINS, etc.) can be addressed by the system automatically, ultimately saving costs, for example, in help desk or administrative calls. Still further, implementations of the present invention allow the function calls of certain preparation software to be easily redirected to another location so that the user can create a template out of a virtual machine located remotely.

As used herein, a "preparation program" refers to a set of generally independent computer-executable instructions configured to interface with a particular file as instructed by a particular user, such as an image file of a virtual machine or operating system, or an image (or executable) of an application program file. The preparation program can then, in accordance with provided template settings, remove certain customized indicia from that file. In at least one implementation with respect to the MICROSOFT operating environment for example, one preparation program (e.g., 145) that can be used in accordance with one or more implementations of the present invention is the System Preparation tool, also referred to as "Sysprep."

In any event, in some cases, such as described primarily herein, the preparation program will further interface with a "preparation agent." by configuration from the user or other administrator. A preparation agent is also a set of computer-executable instructions that effectively acts as a shim interface (e.g., FIG. 1C) between the preparation program and the file of interest (and/or also through any other appropriate interface components relevant to a particular operating system). In particular, the preparation agent will be configured to receive and redirect calls from the preparation program. In at least one implementation, the preparation agent is configured to take and redirect calls from the preparation program without the preparation program's knowledge of such receipt and/or redirection.

FIG. 1A illustrates an overview schematic diagram in accordance with an implementation of the present invention in which a preparation program creates one or more template copies of an offline resource, and installs. One or more other resources or components (not shown) (e.g., one or more other redistribution or storage modules or mechanisms) can then provide the template copies of the resource at one or more host volumes. For example, FIG. 1A shows that server 105 hosts one or more resources, such as resource 140, which is currently "offline" or not running. In this example, resource 140 comprises a "virtual machine," which is essentially an independent entity running on an allocated hard disk partition at server 105.

As a virtual machine, resource 140 can provide most or all of the benefits of a conventional physical machine, such as run application programs, interact with other physical or virtual machines, serve network or database applications/functions, and so on. In one implementation, for example, server 105 comprises a main partition that acts primarily as a storage server, while resource 140 acts as a mail or database server. As such, others on the network are generally unaware that resource 140 is only a virtual machine hosted by server 105, at least in part since resource 140 is sufficiently customized and independently addressable compared with other machines on the network.

FIG. 1A further shows that, at some point, a user desires to duplicate resource 140. For example, the user likes the way the various software settings, updates, and customizations have been applied to resource 140, and so would like to duplicate resource 140 for use on other hosts, without starting from scratch, or removing those software customizations. Accordingly, FIG. 1A shows that preparation program 145 interfaces with resource 140 while it is offline, and creates corresponding template copies 140a. These templates can then be sent, installed, and optionally customized as appropriate, at hosts 110 and 115, in separate volumes (i.e., 165, 180). Upon appropriate customization, these new versions of resource 140 (i.e., resource 140b, 140c can then be viewed as independent entities, which, for all intents and purposes are new machines to other uses on the network.

Figure 1B:
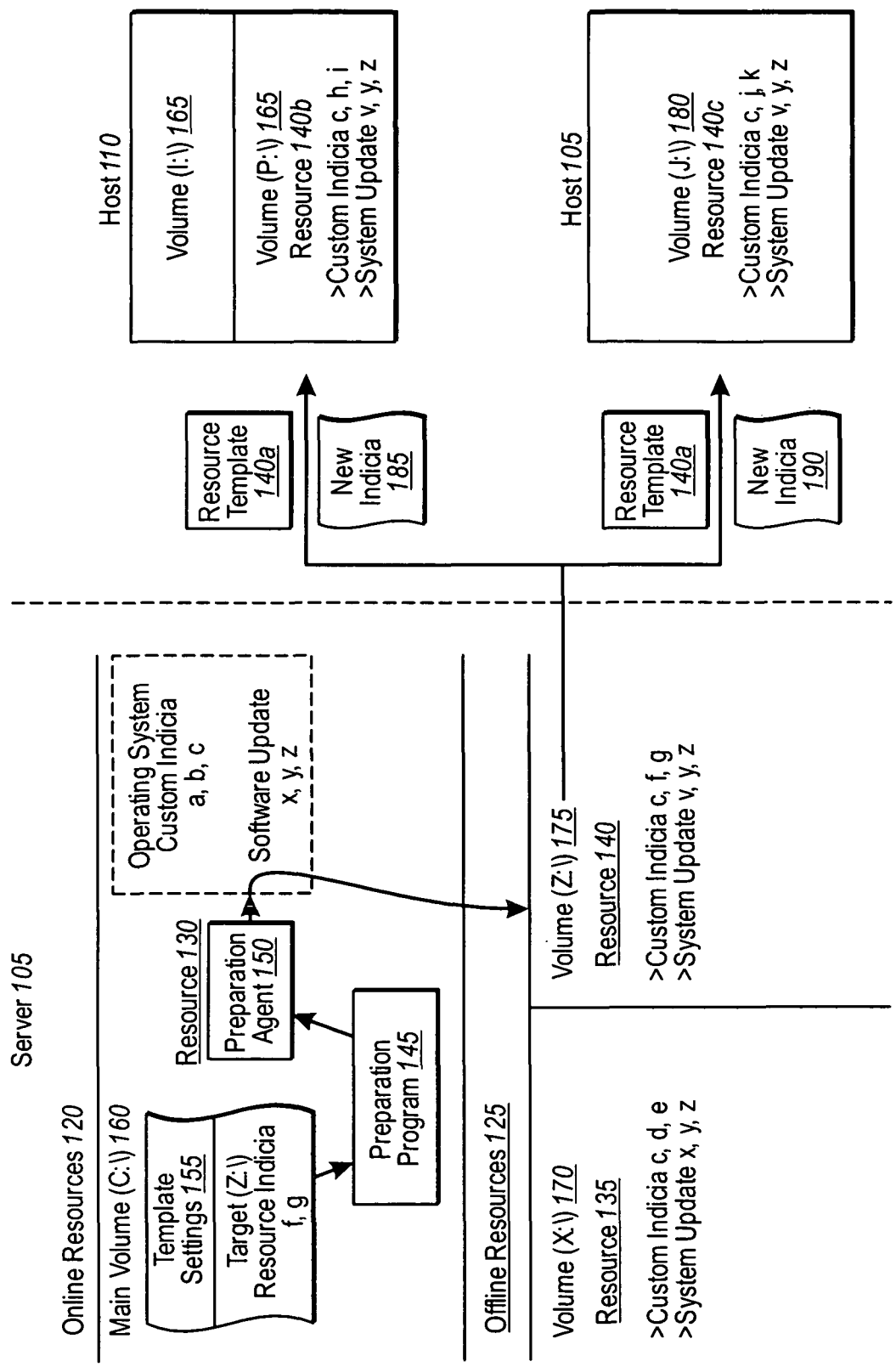
FIG. 1B illustrates a more detailed view of the schematic shown in FIG. 1A in which a preparation program interfaces with a preparation agent to create templates of a resource at one storage medium and install customized versions of that resource at different storage mediums on different host volumes.

FIG. 1B illustrates a more detailed view of the schematic shown in FIG. 1A in which the previously described preparation program 145 interfaces with preparation agent 150 to create templates 140a of resource 140. In particular, FIG. 1B shows that server 105 comprises a plurality of different machines and/or virtual machines, and therefore acts in some respects as a virtual machine library. For example, FIG. 1B shows that server 105 comprises separate entities stored on main volume 160 ("c:\"), as well as additional virtual machine volumes 170 ("x:\") and 175 ("z:\"). Each such volume in this example also includes a particular resource with its own, separately customized operating system. For example, volume 160 has resource 130 stored and/or installed thereon, while volumes 170 and 175 have resources 135 and 140 stored and/or installed thereon, respectively. In this particular case, both resources 135 and 140 are presently offline (i.e., "offline resources" 125).

By way of explanation, this particular example shows that each volume 160, 170, 175, etc. is identifiable through a particular drive letter designation. One will appreciate, however, that this is not required in accordance with implementations of the present invention. For example, a drive path can be designated by any appropriate Global Unique Identifier ("GUID") appropriate for a given operating system. A drive path can also be designed without a GUID in other cases. For example, drive path could designate an un-mounted volume, a mounted volume without a drive letter (e.g., a mount point), a mounted volume with a drive letter, or even a transportable snapshot. Ultimately, there only need be a way of addressing the particular volume. Thus, the illustrations and designations of particular drive or file paths made herein illustrate at least one possible implementation out of descriptive convenience.

In any event, and as previously mentioned, each resource will generally be separately customized at least in terms of basic indicia that allow the resource to be distinguished by a local or remote computer system. For example, FIG. 1B shows that resource 130 comprises "custom indicia a, b, c" while resource 135 comprises "custom indicia c, d, e" and resource 140 comprises "custom indicia c, f, g." Notably, each resource in this case has at least one common indicium "c," which might indicate a domain name, a time zone setting, or some other indicium or property that can be shared. Each resource, however, further comprises unique indicia, such as "a, b" for resource 130, "d, e" for resource 135, and "f, g" for resource 140. For example, the common indicium "c" might be a common network domain name membership, while the unique indicium "a, b," d, e" and "f, g" might be unique computer names, owner accounts, configuration settings, or the like.

FIG. 1B further shows that each resource may also be separately customized with various software versions, updates, and/or patches, etc. For example, resources 130 and 135 include "software updates x, y, z," while resource 140 includes "software updates v, y, and z." At some point, a user might decide that they have a preference for the way that resource 140 runs for any number of reasons, such as being based on updates "v, y, z" rather than "x, y, z." As such, the user might then decide to create a template of resource 140 that preserves the relevant software updates, but removes other custom indicia, such as the computer name, owner accounts, daylight savings settings, or the like.

Accordingly, the user prepares template settings 155, which target resource 140 via volume "z:\" 175, and include a specific request only to remove custom indicia "f, and g." In one implementation, template settings 155 are simply electronic data provided to preparation program 145 and created in response to input received through a user interface. In other cases, template settings 155 can be a file or component created separately using another program, where preparation program 145 simply receives the data therein. In any event, FIG. 1B further shows that preparation program 145 incorporates template settings 155 as it executes through preparation agent 150.

Figure 1C:
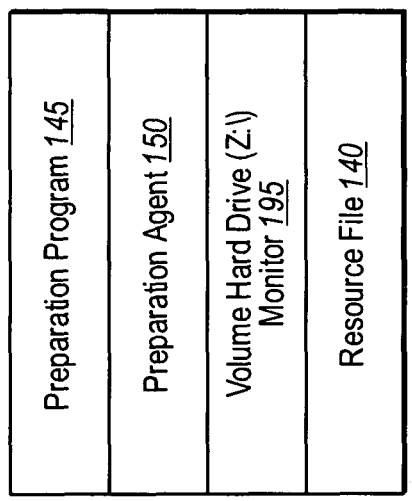
FIG. 1C illustrates a set of application layers in accordance with the present invention configured to redirect function calls from a preparation program to an appropriate resource target file.

As shown in FIG. 1C, for example, preparation agent 150 serves in effect as a shim between preparation program 145 and any other appropriate components, such as a volume hard drive mounter 195, which in turn can interface directly with a corresponding file for the resource. As such, preparation agent 150 can serve at least in part as a shield, in that the function calls made by preparation program 145 can be directed as set up by template settings 155 to another offline volume, rather than to the operating system on which preparation program 145 runs. That is, preparation agent 150 can be configured to redirect function calls to an appropriate target, and thereby ensure that preparation program 145 makes a template only out of resource 140, rather than of resource 130, where preparation program 145 and preparation agent 150 are installed.

Referring again to FIG. 1B, the figure shows that preparation agent 150 redirects the function calls of preparation program 145, which include instructions to strip custom indicia "f, g," from offline resource 140. In one implementation, preparation program 145 simply strips the one or more specified indicium of resource 140 directly, such that a user would need to reconfigure the custom indicia before resource 140 could be turned back online. In another implementation, the user filters the results of the copying and filtration function calls to another file without removing indicia directly from resource 140. In still another implementation, the user may first copy the offline file of resource 140 to a separate location, and then strip the indicia included in template settings 155. However configured, the function calls of preparation program 145 can cause resource 140 to be stripped as specified, resulting in as many template copies 140a as desired with minimal disruption. As previously mentioned, this is at least in part since execution of these function calls will require no additional rebooting or restarting of resource 140.

For example, with particular respect to virtual machines, preparation program 145, via preparation agent 150, can mount any virtual hard disks (e.g., volume 175) of the corresponding resource (i.e., resource image file). Alternatively, preparation program 145 might be configured to simply read or write to the resource file without necessarily mounting the volume. Preparation program 145 can then set up preparation agent 150 with any appropriate flags, such as by initiating preparation agent 150 as a new process in a debugging mode. When initiating preparation agent 150, preparation program 145 can set up preparation agent 150 in accordance with template settings 155 to trap all calls to the file system, trap all calls to the system registry, and trap any other calls necessary to make the execution run successfully. Preparation program 145 can then begin passing the appropriate function calls to preparation agent 150, which then redirects those function calls in accordance with the set up (i.e., template settings 155). For example, commands from preparation program 145 to remove customized indicia from resource 130 are redirected instead by preparation agent 150 to resource 140.

Once the appropriate customizations have been removed, FIG. 1B further shows that the newly created template 140a can now be installed elsewhere as desired. For example, FIG. 1B shows that server 105 provides resource template 140a and a set of new indicia 185 to volume "p:\" at host 110, to thereby create resource 140b. Similarly, FIG. 1B shows that server 105 provides resource template 140a and new indicia 190 to volume "j:\" at host 115, to thereby create resource 140c. In both cases, the new iteration of resource 140 (i.e., resource 140b-c) retains the requested software updates "v, y, z," as well as custom indicium "c." Nevertheless, FIG. 1B shows that resource 140b is at least unique by including additional indicia, such as "h, i" for resource 140b, and "j, k" for resource 140c. As previously mentioned, these unique indicia can correspond to any number of items, such as computer name, or other appropriate settings information.

There are a number of different ways in which the new indicia 185, 190 can be provided during a new installation of resource template 140a. As previously mentioned, for example, these settings may be provided in advance to preparation program 145 through a user interface prompt when stripping the indicia from resource 140, or can be received from a different storage medium, such as a floppy disk, at any appropriate time. In other cases, the preparation program 145 (or the like) can be used again at host 110, 115 to prompt a user for this information through an appropriate user interface at installation.

In addition, one will appreciate that there can be a number of variations on the aforementioned components and mechanisms within the context of the present invention. For example, in addition to stripping custom indicia and/or specific software components or updates from a targeted resource installed on a local volume, a system administrator can also perform such functions on remote offline resources. For example, a system administrator might use preparation program 145 and preparation agent 150 to strip certain software updates of all offline resource in a large enterprise. Similarly, the system administrator might use preparation program 145 and preparation agent 150 to strip all custom indicia from a virtual machine owned by a former employee. In addition, a system administrator might use preparation program 145 and preparation agent 150 to set up a particularly customized version of an operating system for use at personal stations around an enterprise, and then create copies that can be installed with minimal effort at east station.

Still further, individual users can use these components in various personal settings. For example, a user could create a copy of a working, updated version of an operating system that has all patches and various security software installed and configured, remove the relevant product keys, and then reinstall this copy at another friend's or family member's computer with different but valid product keys, computer names, and so on. Accordingly, FIGS. 1A-1C illustrate a number of schematics and components that can be used in a wide range of settings to create templates of existing resources with a great deal of efficiency and precision.

Figure 2:
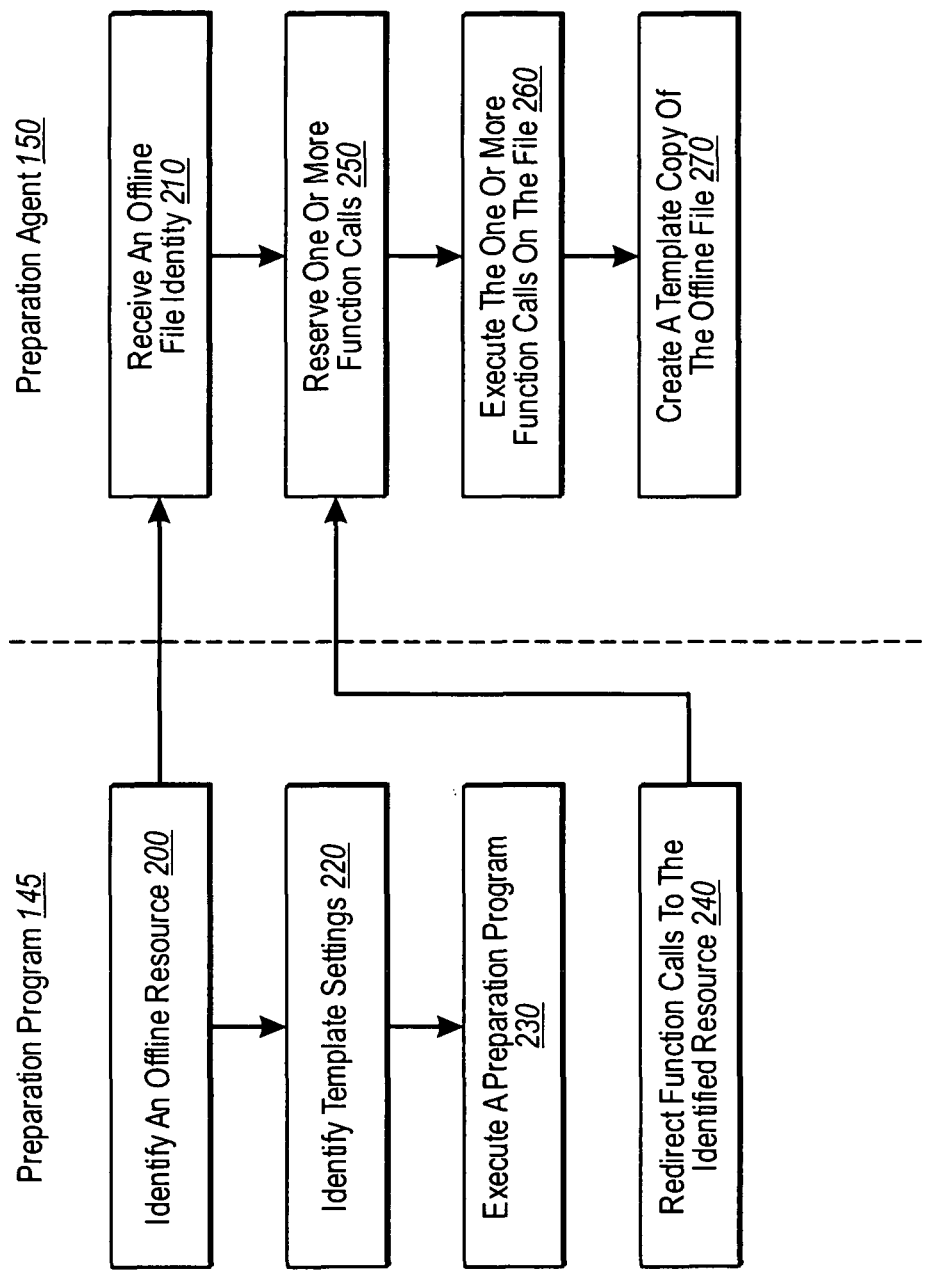
FIG. 2 illustrates flowcharts comprising a series of acts from the perspective of a preparation program and of a preparation agent for creating a template copy of an offline resource.

Implementations of the present invention can also be described in terms of flowcharts of one or more method comprising a series of different acts for accomplishing a particular result. In particular, FIG. 2 illustrates flowcharts of acts from the perspective of preparation program 145 and of preparation agent 150 for creating a template copy of an offline resource. The acts of FIG. 2 are described below with reference to the components and mechanisms described in FIGS. 1A through 1C.

As a preliminary matter, reference is sometimes made herein to a "first," "second," or "third" component (e.g., first, second, or third storage space). One will appreciate, however, that such designations are merely to differentiate components, such that the "first" component or storage space need only be different from a "second" or "third" component or storage space, without regard to points at which the component might be accessed. For example, the use of a first storage space, and a second, or third storage space only means that those first, second, or third storage spaces are at least different from each other, and these designations do not require that the first, second, or third storage spaces are necessarily presented, accessed, created, or have other action performed thereon in any particular sequence or order.

For example, FIG. 2 shows that a method from the perspective of preparation program 145 for creating a template of at least one of the one or more software resources while the at least one software resource is offline, comprises an act 200 of identifying an offline resource. Act 200 includes identifying an offline software resource. For example, preparation program 145 receives input from a user to create a template out of resource 140, which is located at volume "z:\" 175.

Similarly, FIG. 2 shows that the method from the perspective of preparation agent 150 for duplicating a virtual machine while it is offline, such that the virtual machine and the duplicate virtual machine have distinguishable identities when running, comprises an act 210 of receiving an offline file identity. Act 210 includes receiving the identity of a virtual machine file installed on a first storage space. For example, preparation agent 150 receives an indication from preparation program to target resource 140 on volume "z:\" 175. In the specific case of a virtual machine, resource 140 may be identifiable as a single file, such as a Virtual Hard Disk (i.e., ".vhd," "VHD," or ".vhd") file. One will appreciate that in some cases, a virtual machine may alternatively be represented alternatively by a plurality of ".vhd" files.

FIG. 2 also shows that the method from the perspective of preparation program 145 comprises an act 220 of identifying template settings. Act 220 includes identifying one or more template settings that identify one or more indicia to be removed from the software resource. For example, preparation agent 145 receives template settings 155, which include instructions to remove custom indicia "f, g," but to preserve any one or more of software updates "v, y, z," as desired. In addition, FIG. 2 shows that the method from the perspective of preparation program 145 comprises an act 230 of executing the preparation program. Act 230 includes executing at a first operating system a preparation program configured to remove indicia in accordance with the template settings. For example, FIG. 1B shows that preparation program 145 runs and/or executes on resource 130 (i.e., the corresponding operating system), but redirects function calls to resource 140 in accordance with template settings 155.

Accordingly, FIG. 2 shows that the method from the perspective of preparation program 145 further comprises an act 240 of redirecting function calls to the identified resource. Act 240 includes redirecting one or more function calls of the preparation program to the identified software resource, such that the indicia identified by the one or more template settings are removed from the software resource, and such that a template of the software resource is created. For example, preparation program 145 initiates preparation agent 150 as a new process in debugging mode, and sets up preparation agent 150 with all appropriate redirection functions in accordance with template settings 155. Thus, when preparation program 145 sends a function call to remove a custom indicium, the call is appropriately redirected to the targeted software resource, and a template is ultimately created.

Similarly, therefore, FIG. 2 further shows that the method from the perspective of preparation agent 150 comprises an act 250 of receiving one or more function calls. Act 250 includes receiving one or more function calls from a preparation program installed on a second storage space, the one or more function calls requesting removal of one or more indicia. For example, as shown in both FIGS. 1B and 1C, preparation agent 150 interfaces directly with preparation program 145 to receive instructions and implement those instructions where indicated by template settings 155. As such, preparation agent 150 can ensure that, though preparation program 145 is executed on main volume 160, the intended stripping functions only occur on the volume (e.g., 175) of the appropriate offline target (e.g., resource 140).

In addition, FIG. 2 shows that the method from the perspective of preparation agent 150 comprises an act 260 of executing the one or more function calls on the file. Act 260 includes executing the one or more function calls on the virtual machine file, such that the one or more indicia are removed at the first storage space. For example, in the particular case of a virtual machine that is represented by a virtual machine file, preparation agent 150 interfaces directly with the virtual machine file (or directly with a volume hard drive mounter 195) to remove the specified custom indicia (e.g., "f, g" of resource 140) or unwanted software components from the virtual machine file. This execution by preparation agent 150 can be done locally-on server 105, or even via remote function calls over a network.

FIG. 2 further shows that the method from the perspective of preparation agent 150 comprises an act 270 of creating a template copy of the offline file. Act 270 includes creating a template copy of the virtual machine file. For example, as shown in FIG. 1B, the results of execution on resource 140 are the creation of template copies 140, which include software updates "v, y, z," and only custom indicium "c."

Accordingly, the methods and corresponding components and schematics described herein provide one or more implementations for creating an template of an offline software resource much more efficiently than otherwise available. In particular, implementations of the present invention allow templates to created using processes that are relatively fast, reliable, and typically require no end-user interaction or credentials to perform the customization. In addition, there is no explicit need to run the software resource (i.e. the virtual machine) or install additional software components on the software resource before preparing it. Furthermore, these features can all be performed with little interface on the virtual machine, that is, without necessarily requiring user logon, user profile creation, or the like. Still further, since these preparation programs and components are generally generic enough to be used on a wide range of resources, these preparation programs and components do not necessarily need to be updated each time a corresponding target software resource undergoes a version change.

As previously mentioned, this ability to create templates in such an efficient manner can be very useful for large enterprises that wish to install particularly customized or updated software resources at various computer stations. In particular, implementations of the present invention allow such copies to be made with less time and effort than previously needed, and allow such copies to be installed to a particularly customized point also with much less time and effort than previously needed. Such advantages can be particularly helpful to duplicating virtual machines, operating systems, and application programs that may be customized from a software and/or personalization standpoint many times over during their lifetime.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of creating a template of a software resource in a computerized environment, wherein the computerized environment comprises one or more computer systems hosting at least a first virtual machine and comprising a first operating system on which a preparation program runs, the method comprising:
   identifying, by the preparation program, during operation of the first operating system in the computerized environment, a first instance of a software resource installed on, but not running on, the first virtual machine in response to receiving a request for creating a template of the software resource, the first instance of the software resource having a first set of indicia;

identifying, by the preparation program, one or more template settings that identify at least one of one or more indicia to be removed from the first instance of the software resource and one or more indicia to be added to the first instance of the software resource;

initiating, by the preparation program, function calls to customize the first instance of the software resource in accordance with the one or more template settings;

redirecting, by a preparation agent, the function calls to the first instance of the software resource to create the template of the software resource, wherein creating the template of the software resource by the preparation agent further comprises:

accessing the indicia to be at least one of removed and added to customize the first instance of the software resource, and at least one of adding and removing the indicia in the first instance of the software resource wherein the first instance of the software resource is now the created template.

2. The method as recited in claim 1, wherein the first instance of the software resource is an operating system of the first virtual machine.

3. The method as recited in claim 1, wherein the first instance of the software resource is an application program installed on the operating system of the first virtual machine.

4. The method as recited in claim 1, wherein the preparation agent is configured to pass the one or more function calls to the third instance of the software resource through a resource mounter.

5. The method as recited in claim 1, wherein the first instance of the software resource is a volume hard disk file, and wherein the resource mounter is at least one of a volume hard drive mounter, and an application or system library configured to provide access to a corresponding physical disk.

6. The method as recited in claim 5, wherein the volume hard disk file corresponds to the first virtual machine.

7. The method as recited in claim 1, wherein the one or more template settings comprise a system or user setting comprising an indication of any one or more of computer name, user name, company name, domain name, or network address.

8. The method as recited in claim 1, wherein the one or more template settings comprise a system or user setting comprising an indication of any one or more of a daylight savings setting, or a time zone setting.

9. The method as recited in claim 1, wherein the one or more template settings comprise a system or user setting comprising an indication of any one or more of a resource product key, a software version, or a security setting.

10. The method as recited in claim 1, wherein the one or more customized indicia are received from any one of a storage medium or network interface.

11. The method as recited in claim 1, wherein the one or more customized indicia are received through a user interface.

12. A method of duplicating a virtual machine file in a computerized environment comprising at least a first virtual machine, a second virtual machine, a third virtual machine, a first storage space, a second storage space, and a third storage space, the virtual machine file and the duplicated virtual machine file have distinguishable identities, the method comprising:

identifying, by a preparation program installed on the second storage space, during operation of the second virtual machine in the computerized environment, a virtual machine file installed on, but not running on, the first virtual machine in response to receiving an indication of the virtual machine file, wherein the first virtual machine is located on the first storage space and the virtual machine file has a first set of customized indicia;

receiving, by a preparation agent installed on the second storage space, the identity of the virtual machine file;

receiving one or more function calls from the preparation program through the preparation agent, the one or more function calls requesting at least one of removal of one or more indicia to be removed from the virtual machine file and requesting addition of one or more indicia to be added to the virtual machine file;

executing the one or more function calls on the virtual machine file, such that at least one of the one or more indicia to be removed are removed in the first virtual machine located on the first storage space and such that the one or more indicia to be added are added in the first virtual machine located on the first storage space;

creating a template of the virtual machine file having a second set of customized indicia; and installing the template of the virtual machine file on the third virtual machine located on the third storage space.

13. The method as recited in claim 12, further comprising storing the removed one or more indicia that were removed from the virtual machine file.

14. The method as recited in claim 12, wherein the virtual machine file further comprises a first and second software update.

15. The method as recited in claim 14, wherein the one or more indicia to be removed include a request to remove the second software update but not the first software update.

16. A computer program product having computer-executable instructions stored thereon that, when executed in a computerized environment, cause one or more processors to perform a method of creating a template of a software resource, wherein the computerized environment comprises one or more computer systems hosting at least a first virtual machine and comprising a first operating system on which a preparation program runs, the method comprising:

identifying, by the preparation program, during operation of the first operating system in the computerized environment, a first instance of a software resource installed on, but not running on, the first virtual machine in response to receiving a request for creating a template of the software resource, the first instance of the software resource having a first set of indicia;

identifying, by the preparation program, one or more template settings that identify at least one of one or more indicia to be removed from the first instance of the software resource and one or more indicia to be added to the first instance of the software resource;

initiating, by the preparation program, function calls to customize the first instance of the software resource in accordance with the one or more template settings;

redirecting, by a preparation agent, the function calls to the first instance of the software resource to create the template of the software resource, wherein creating the template of the software resource by the preparation agent further comprises:

accessing the indicia to be at least one of removed and added to customize the first instance of the software resource, and at least one of adding and removing the indicia in the first instance of the software resource wherein the first instance of the software resource is now the created template.

* * * * *